J. E. HENDERSON.
WEIGHING AND BAGGING MACHINE.
APPLICATION FILED NOV. 27, 1914.
1,155,487.
Patented Oct. 5, 1915.
3 SHEETS—SHEET 2.
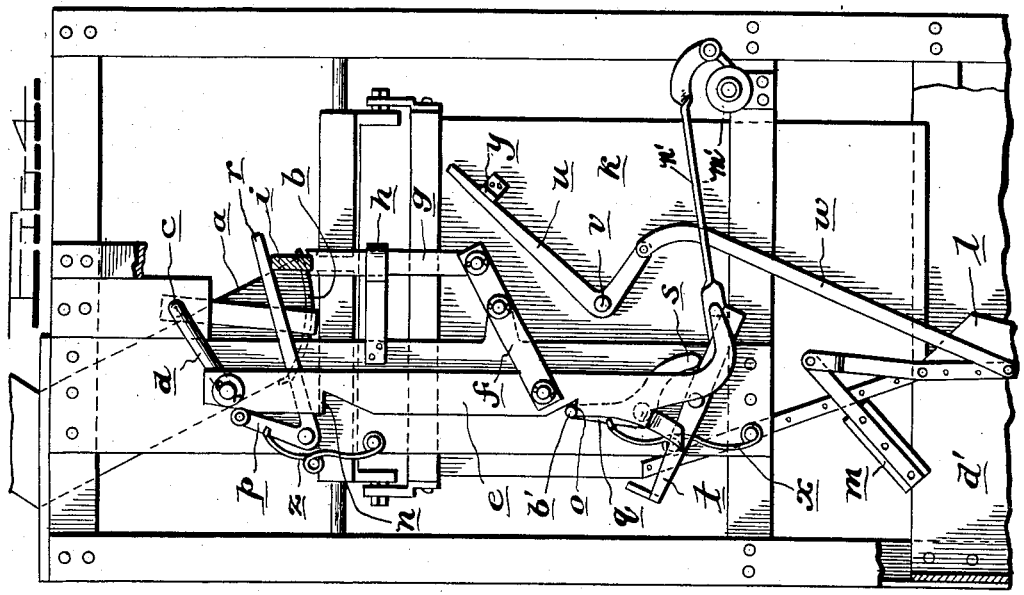
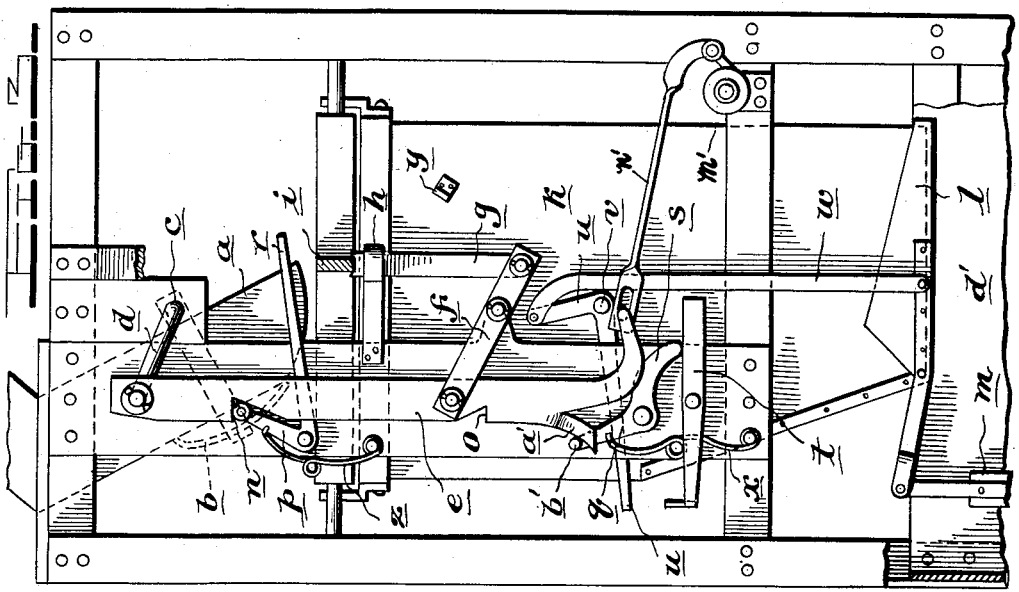

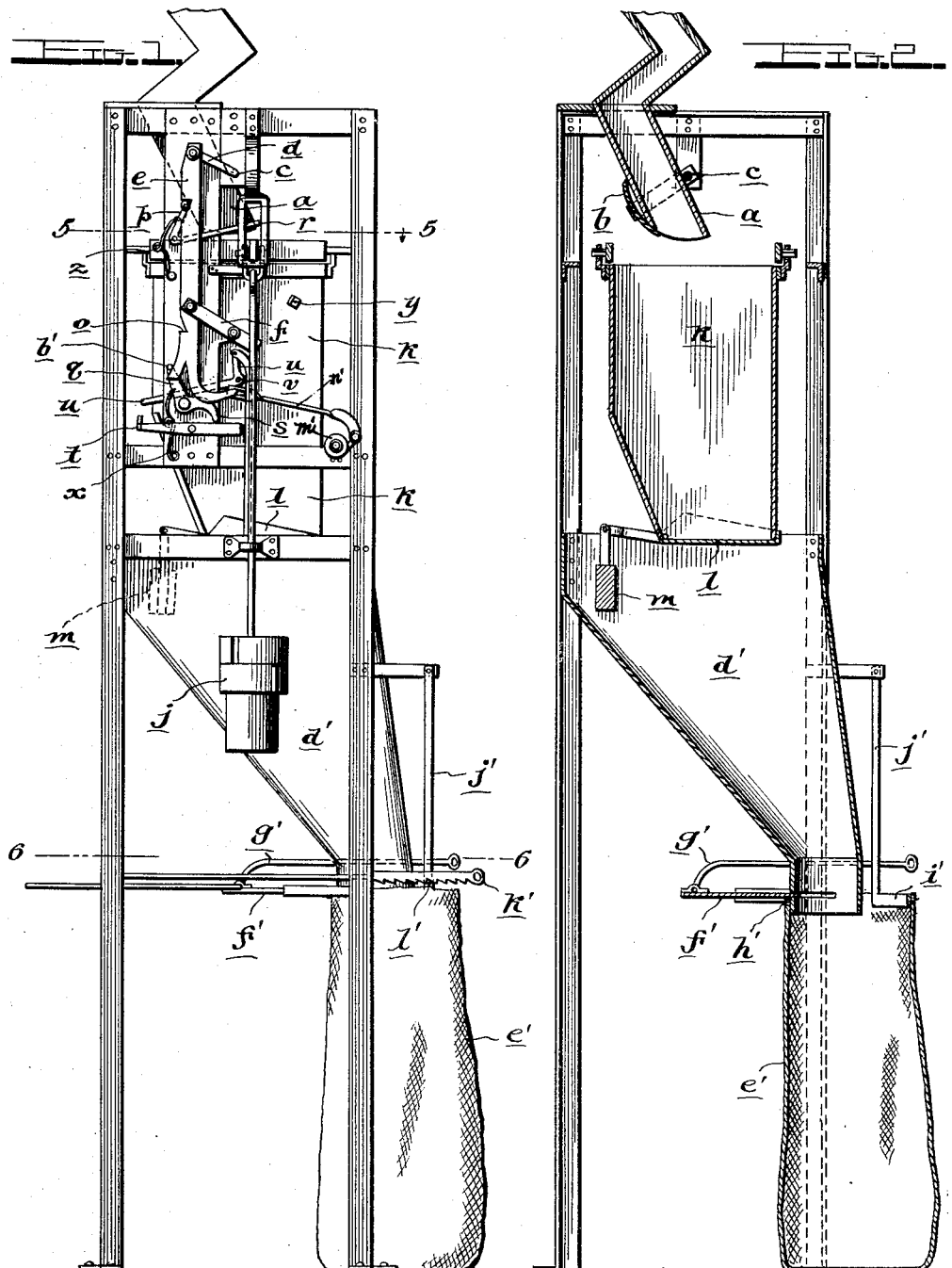

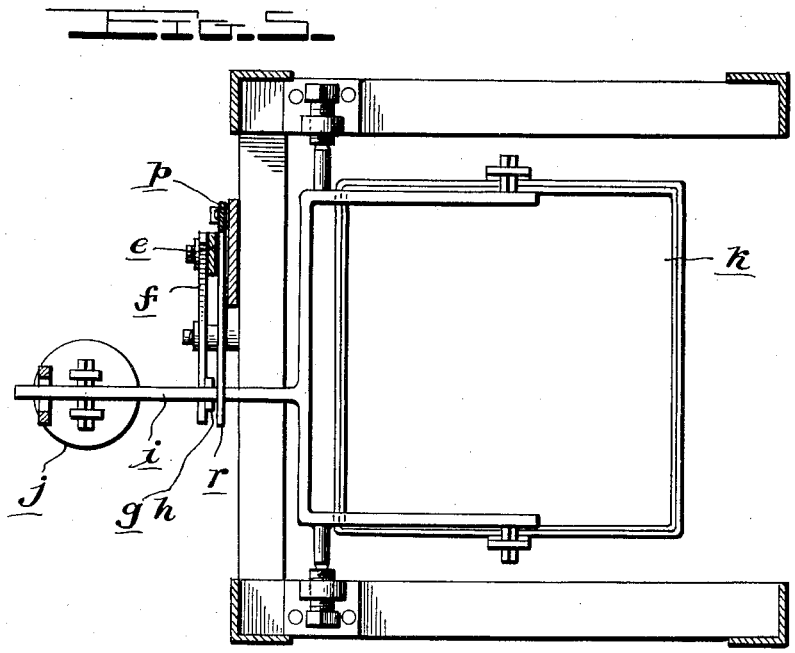

UNITED STATES PATENT OFFICE.

JOSEPH E. HENDERSON, OF MONROE, NORTH CAROLINA.

WEIGHING AND BAGGING MACHINE.

1,155,487.  Specification of Letters Patent.  Patented Oct. 5, 1915.

Application filed November 27, 1914.  Serial No. 874,183.

*To all whom it may concern:*

Be it known that I, JOSEPH E. HENDERSON, a citizen of the United States of America, and a resident of Monroe, county of Union, State of North Carolina, have invented certain new and useful Improvements in Weighing and Bagging Machines, of which the following is a full and clear specification, reference being had to the accompanying drawings, in which—

Figure 1 is a side elevation and Fig. 2 is a vertical sectional view of my apparatus complete; Fig. 3 is a side elevation of the hopper tripping mechanism showing the parts in the position they assume while the hopper is filling, parts being broken away; Fig. 4 is a similar view showing the hopper tripped in the act of discharging; and Fig. 5 is a horizontal section on the line 5—5 of Fig. 1.

The object of this invention is to provide simple and reliable mechanism for tripping and thus emptying the weighing hopper as soon as the predetermined amount of grain is deposited in the hopper, means being provided for holding the hopper in discharging position until the entire contents thereof have been discharged, as more fully hereinafter set forth.

In the drawing, $a$ designates the usual supply spout adapted to be closed by a swinging gate $b$ carried by rock shaft $c$, one of whose ends is provided with crank arm $d$. The vertical gravitating bar $e$ has its upper end pivotally connected to the end of said crank arm and its lower end pivotally connected to an adjacent part of the frame by means of a link $f$, one end of this link being extended and pivotally connected to a vertically movable rod $g$ guided by an eye $h$ attached to an adjacent part of the frame.

Below the spout is pivotally supported the weigh beam $i$ which has suspended on it at its outer end the usual variable weight $j$ and on its inner end the usual weighing hopper $k$. The hopper is closed at its lower end by a gate $l$, this gate being normally held closed by a counter-balancing weight $m$.

In one edge the bar $e$ is provided with an upper notch $n$ and a lower notch $o$, and a spring actuated pawl $p$ pivoted on the frame is adapted to engage in the upper notch $n$ to hold the bar $e$ up while another pawl $q$ is pivoted on the frame in such position as to lock the bar $e$ in its down position. Attached to the pawl $p$ is an arm $r$ which extends laterally into the path of the weight beam $i$, and attached to pawl $q$ is an arm $s$ which is normally pressed downwardly against the pivoted lever $t$, mounted on the frame. An angle lever $u$ is pivoted on the hopper $k$ and has one arm lying in the path of one end of lever $t$ and has its upper end extending upwardly from its pivot $v$, this upper end being pivotally attached to the rearwardly turned end of a vertical link $w$ whose lower end is pivotally attached to gate $l$.

When the parts are in position to receive the substance to be weighed into the hopper $k$ (which, of course, is in its elevated position), rod $g$ rests under the weigh beam, gate $b$ is open, and upper pawl $p$ is engaged in its notch to lock the parts in these positions. When the predetermined quantity of the substance to be weighed has entered the hopper $k$, the weight $j$ will be overbalanced and the hopper $k$ will descend. As the weigh beam $i$ ascends it will strike arm or finger $r$ and disengage pawl $p$ from bar $e$, thus allowing the bar to drop by its own weight, thus immediately cutting off the supply of material through spout $a$. When bar $e$ falls, the rod $g$ will follow the beam upwardly and the lower end of the bar $e$ will strike against one end of lever $t$ and thus cause the other end of lever $t$ to swing upwardly in contact with the horizontal arm of the bell crank $u$. The upward movement of the horizontal arm of bell crank $u$ on pivot $v$ will cause the upwardly extending arm thereof to swing over far enough to throw its pivotal connection with rod $w$ over the center of the pivot $v$, thus unlocking gate $l$ and allowing the weight of the grain or other substance to instantly open the same and start the discharging action. When the lever $t$ is thus tilted the spring ($x$) which actuates pawl $q$ will cause the arm $s$ of pawl $q$ to follow the descending end of this lever $t$, and this action of the pawl will cause it to engage in lower notch $o$ and thus lock all the parts in discharging position. To limit the movement of the locking bell crank $u$, I provide the hopper with a stop $y$. When the discharge from the hopper $k$ is completed, weight $m$ will overbalance the gate $l$ and thus swing the gate upwardly to closing position and thus swing the bell crank $u$ back to the position shown in Fig. 3. This action of the bell crank will cause its horizontal arm to strike against and depress the upwardly swinging end of lever $t$, and this action of lever $t$ will unlock pawl $q$ and thereby release the bar $e$. When this bar $e$ is thus released, the hopper $k$ (being then empty) will ascend, and this ascent of the hopper will press downwardly the rod $g$ and thus lift the bar $e$ far enough to permit pawl $p$ to again engage it and lock it in its up position, whereupon the apparatus is ready to receive into the weighing hopper another charge. The upper pawl $p$ is pressed toward the bar $e$ by springs $z$ and the lower pawl by means of the above mentioned spring $x$. The lower end of the bar $e$ is provided with a rearwardly curved cam part $a'$, which, when the bar $e$ ascends, engages a finger $b'$ on the end of pawl $p$ and forces the upper end of the pawl far enough rearwardly to permit the lever $t$ to assume its proper position with reference to the horizontal arm of the bell crank $u$.

From the weighing hopper $k$ the grain falls into a funnel $d'$, which is provided at its lower end with means for suspending the bag $e$. To close the funnel I show gate $f'$ operated by a hand rod $g'$. The bag is suspended on teeth $h'$ on the back of the funnel mouth and upon teeth carried by the curved bar $i'$, this bar $i'$ being carried at the lower ends of swinging links $j'$. The mouth of the bag is held distended by means of a rod $k'$ pivoted to the frame-work of the machine and provided with ratchet teeth which engage a pin $l'$ carried by one of the pendent bars $j'$. Any other form of bag-holder may be employed, as is obvious.

A counter or register $m'$ may be operated by my mechanism by connecting it, by an arm $n'$, to the lower end of the gravitating bar $e$ or to one of the other movable parts of the apparatus.

Having thus described my invention, what I claim is:

1. In a weighing machine, a supply spout and a gate therefor, a weigh beam and a weighing hopper suspended therefrom, the hopper being provided with a normally closed discharge gate, means for locking this latter gate closed, and means for simultaneously unlocking the discharge gate and closing the supply gate when the hopper descends, said means embodying a notched gravitating bar and pawls for locking said bar up or down, and means for actuating these pawls.

2. In a weighing machine, a supply spout and a gate therefor, a weigh beam and a weighing hopper suspended therefrom, the hopper being provided with a normally closed discharge gate, means for locking this latter gate closed, and means for simultaneously unlocking the discharge gate and closing the supply gate when the hopper descends, said means embodying a notched gravitating bar and pawls for locking said bar up or down, and means for actuating these pawls, means being provided whereby the descent of the weighted end of the weigh beam positively lifts the gravitating bar.

In testimony whereof I hereunto affix my signature in the presence of two witnesses.

JOSEPH E. HENDERSON.

Witnesses:
E. MONROE,
J. V. HENDERSON.